A. A. WEST.
HAIR CURLER.
APPLICATION FILED MAY 27, 1920.

1,381,776. Patented June 14, 1921.

Inventor.—
Augustus A. West.
by his Attorneys.
Howson & Howson.

UNITED STATES PATENT OFFICE.

AUGUSTUS A. WEST, OF PHILADELPHIA, PENNSYLVANIA, ASSIGNOR TO DAVID L. SHORT, OF PHILADELPHIA, PENNSYLVANIA.

HAIR-CURLER.

1,381,776.     Specification of Letters Patent.     Patented June 14, 1921.

Application filed May 27, 1920. Serial No. 384,613.

*To all whom it may concern:*

Be it known that I, AUGUSTUS A. WEST, a citizen of the United States, residing in Philadelphia, Pennsylvania, have invented certain Improvements in Hair-Curlers, of which the following is a specification.

My invention relates to hair curlers of the type forming the subject-matter of my former U. S. Patent No. 785,844, and the object of my present invention is to provide means whereby the outer free ends of the curler arms may be locked together, said means being such as to prevent accidental opening of the curler.

Figure 1:
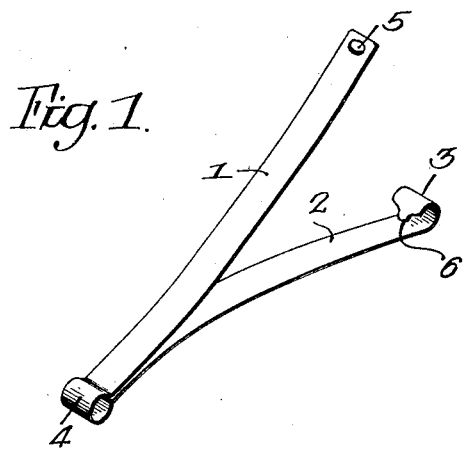
Figure 1, is a view in perspective of a curler embodying my invention.

With reference to the drawings, the curler comprises two resilient arms 1 and 2, substantially smooth and flat in the present instance, and joined together at one end thereof, the effective length of said arm 2 being greater than that of the arm 1 and having the outer end thereof turned inwardly and backwardly to form a hook 3, under which the outer end of the arm 1 is adapted to be inserted when the fastener is to be closed. In the present instance, the two arms are made integral, and that portion of the curler at the juncture of said arms is rounded outwardly, as clearly indicated in the drawings, said rounded portion being indicated by the reference numeral 4.

It has been found of great advantage in curlers of this type to provide the ends of the arms 1 and 2 with substantially positive locking means for preventing accidental disengagement of the arms after the fastener is once closed, and such a locking means of novel form and a particularly high degree of effectiveness constitutes the subject of my present invention.

Figure 2:
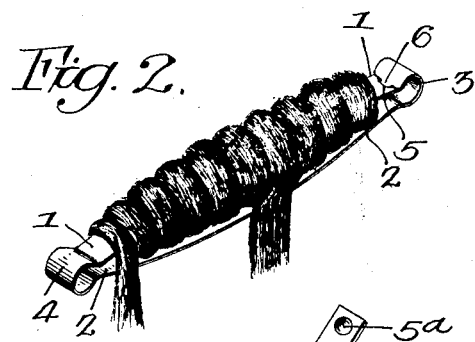
Fig. 2, is a view in perspective of the curler closed and holding a lock of hair.

The preferred form of my invention is illustrated in Figs. 1 and 2, in which the said arm 1 is provided with an aperture 5 in the outer end thereof, said aperture being oval in the present instance, the arm 2 having a tongue 6 projecting from the turned-over end thereof, which, when the curler is closed as illustrated in Fig. 2, extends downwardly through the said aperture 5, whereby accidental dislodgment of the outer end of the arm 1 from under the turned-in end of the arm 2 is prevented.

Figure 3:
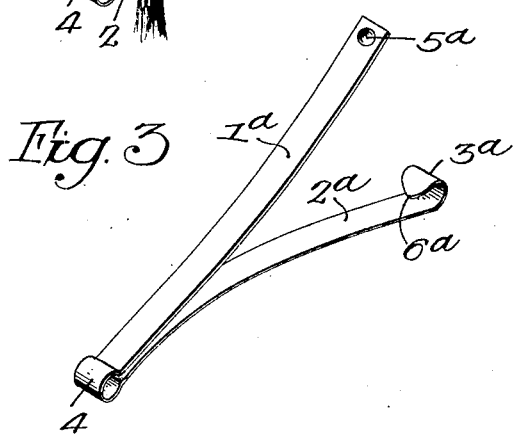
Fig. 3, is a view in perspective of a curler embodying a modified form of my locking means.

In Fig. 3, I have shown a modified form of my locking device, the locking means consisting in this instance of a depression $5^a$ at the outer end of the arm $1^a$, the inturned end $3^a$ of the arm $2^a$ being brought to a point $6^a$ which is adapted to enter the depression $5^a$ and prevent the dislodgment of the end of the arm $1^a$ from under the hook $3^a$.

It will be apparent from the above description that the invention is to be limited neither to an aperture nor to a depression in the arm 1 for the reception of the turned-over end of the arm 2, since any form of hole will suffice for this purpose, nor is the invention to be limited to any particular conformation of the turned-over end of the arm 2 which occupies the said hole, numerous modifications being possible in each case with no departure from the essential features of the invention.

I claim:

1. A hair curler comprising two resilient arms joined together at one end thereof, the outer end of one of said arms being turned inwardly and backwardly to form a hook under which the outer end of said other arm may be inserted, and the outer end of said last-mentioned arm having a hole therein for the reception of the turned-over end of said first-named arm, substantially as and for the purpose set forth.

2. A hair curler comprising two resilient arms joined together at one end thereof, the outer end of one of said arms being turned inwardly and backwardly to form a hook under which the outer end of said other arm may be inserted, the outer end of said last-named arm being apertured, and a tongue extending from the turned-over end of said first-named arm and adapted to enter the said recess for preventing accidental disengagement of the said arms.

AUGUSTUS A. WEST.